US012768391B2

(12) United States Patent
Haguenauer et al.

(10) Patent No.: US 12,768,391 B2
(45) Date of Patent: Oct. 20, 2026

(54) SEPARATION DEVICE COMPRISING A DAMPING ELEMENT

(71) Applicant: PYROALLIANCE, Les Mureaux (FR)

(72) Inventors: Bertrand Haguenauer, Les Mureaux (FR); Sebastien Perez, Les Mureaux (FR); Christophe Lamontagne, Les Mureaux (FR); Eric Gibaud, Les Mureaux (FR)

(73) Assignee: PYROALLIANCE, Les Mureaux (FR)

(*) Notice: Subject to any disclaimer, the term of this patent is extended or adjusted under 35 U.S.C. 154(b) by 387 days.

(21) Appl. No.: 18/579,145

(22) PCT Filed: Jul. 11, 2022

(86) PCT No.: PCT/FR2022/051395

§ 371 (c)(1),
(2) Date: Jan. 12, 2024

(87) PCT Pub. No.: WO2023/285761

PCT Pub. Date: Jan. 19, 2023

(65) Prior Publication Data

US 2024/0318682 A1 Sep. 26, 2024

(30) Foreign Application Priority Data

Jul. 16, 2021 (FR) ........................................ 2107692

(51) Int. Cl.

*F16B 31/00* (2006.01)
*B64G 1/64* (2006.01)
*F16B 37/08* (2006.01)

(52) U.S. Cl.

CPC ............ *F16B 31/005* (2013.01); *B64G 1/645* (2013.01); *F16B 37/08* (2013.01); *B64G 1/6457* (2023.08)

(58) Field of Classification Search

CPC .... B64G 1/6425; B64G 1/645; B64G 1/6455; B64G 1/6459; F16B 31/005; F16B 37/08; F42B 15/36; F42B 3/006

(Continued)

(56) References Cited

U.S. PATENT DOCUMENTS 4,187,759 A * 2/1980 Toy ......................... F42B 15/36
89/1.14
5,123,794 A * 6/1992 Pire ......................... F42B 3/006
411/383

(Continued)

FOREIGN PATENT DOCUMENTS

CN 108033038 B * 3/2019 ............ B64G 1/641
FR 2661466 A1 8/1992

(Continued)

OTHER PUBLICATIONS

Search Report and Written Opinion issued in International Application No. PCT/FR2022/051395, mailed on Oct. 21, 2022.

(Continued)

*Primary Examiner* — Nicholas L Foster

(74) *Attorney, Agent, or Firm* — Bookoff McAndrews, PLLC

(57) ABSTRACT

A separating device including a release ring able to slide along a segmented nut, the release ring being configured to move between a first position wherein the segments of the nut are retained around a fastening screw and a second position wherein the segments of the nut are released, said device being characterized in that the release ring is moreover configured to travel a determined distance between the second position and a third position wherein said ring is in contact with a damping element located between said ring (Continued)

and an annular shutter, the release ring not being in contact with the damping element between the second position and the third position.

20 Claims, 6 Drawing Sheets

(58) Field of Classification Search
USPC .......................................................... 411/391
See application file for complete search history.

(56) References Cited

U.S. PATENT DOCUMENTS

| | | | | |
|---|---|---|---|---|
| 5,671,650 | A * | 9/1997 | Aubret | B64G 1/641 102/378 |
| 6,352,397 | B1 * | 3/2002 | O'Quinn | F16B 37/0864 411/270 |
| 6,629,486 | B2 * | 10/2003 | Forys | F15B 15/19 89/1.14 |
| 10,480,898 | B2 * | 11/2019 | Kim | F41F 3/052 |
| 11,554,884 | B2 * | 1/2023 | Remmelg | F16B 31/005 |
| 11,661,216 | B2 * | 5/2023 | Remmelg | F16B 31/005 244/173.3 |
| 2001/0025564 | A1 * | 10/2001 | Forys | F15B 15/19 89/1.14 |
| 2013/0101369 | A1 * | 4/2013 | Lenoir | B64G 1/641 411/2 |
| 2020/0189771 | A1 * | 6/2020 | Remmelg | F16B 31/005 |
| 2020/0346788 | A1 * | 11/2020 | Remmelg | F16B 31/005 |

FOREIGN PATENT DOCUMENTS

| | | | |
|---|---|---|---|
| FR | 2713326 | A1 | 1/1996 |
| FR | 2736615 | A1 | 9/1997 |
| FR | 2807123 | A1 | 9/2002 |
| RU | 2684969 | C1 | 4/2019 |

OTHER PUBLICATIONS

Search Report issued in French Application No. 2107692, mailed Mar. 3, 2022.

* cited by examiner

[Fig. 1]
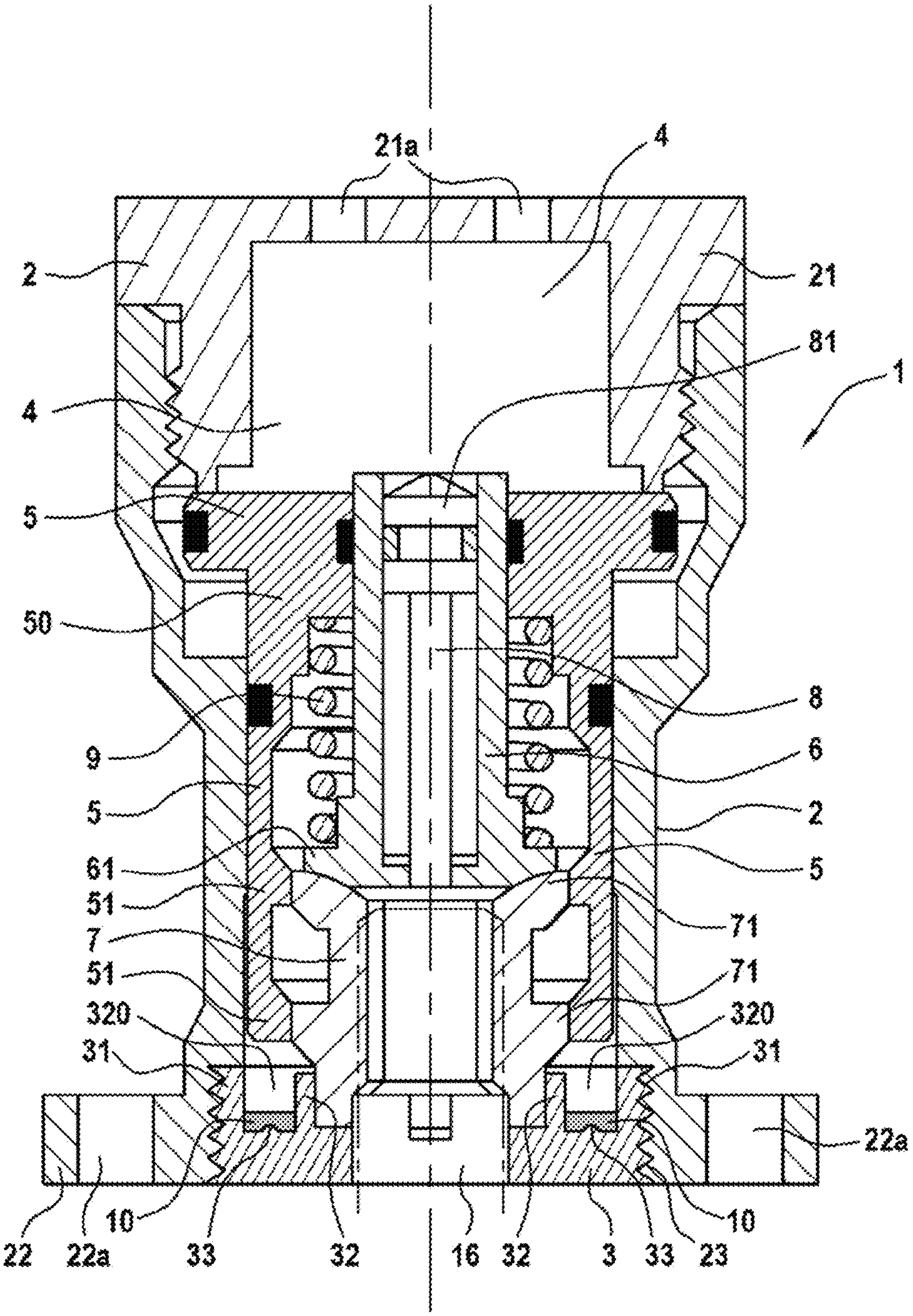

[Fig. 2]
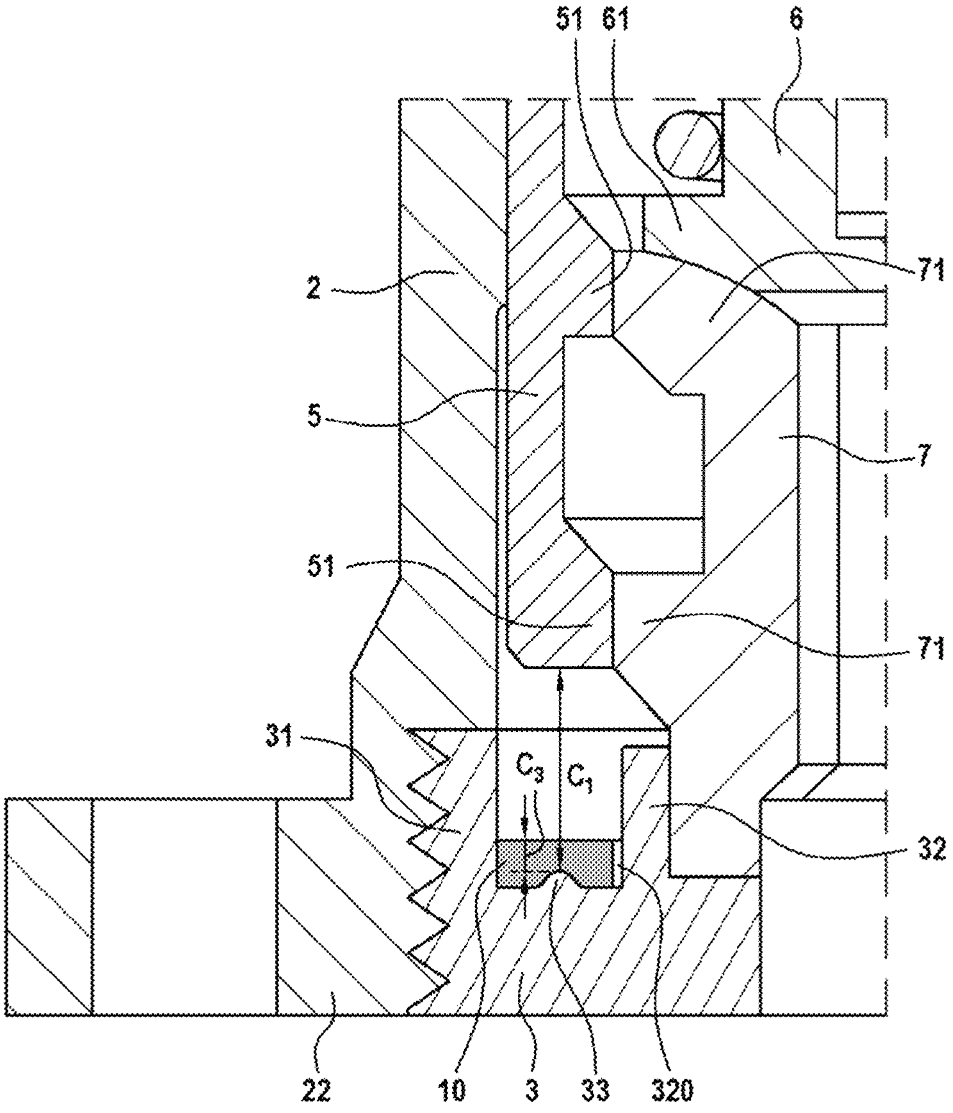

[Fig. 3]
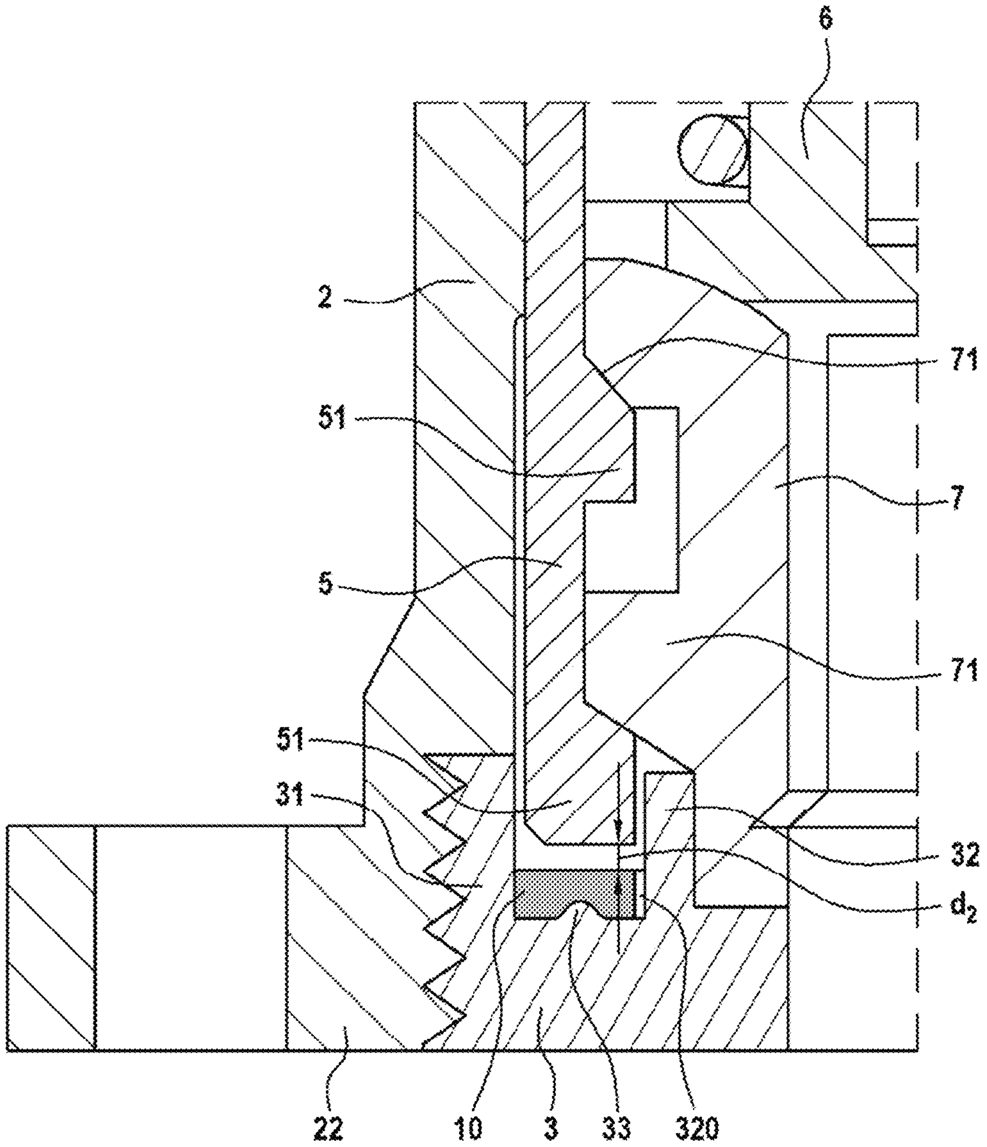

[Fig. 4]
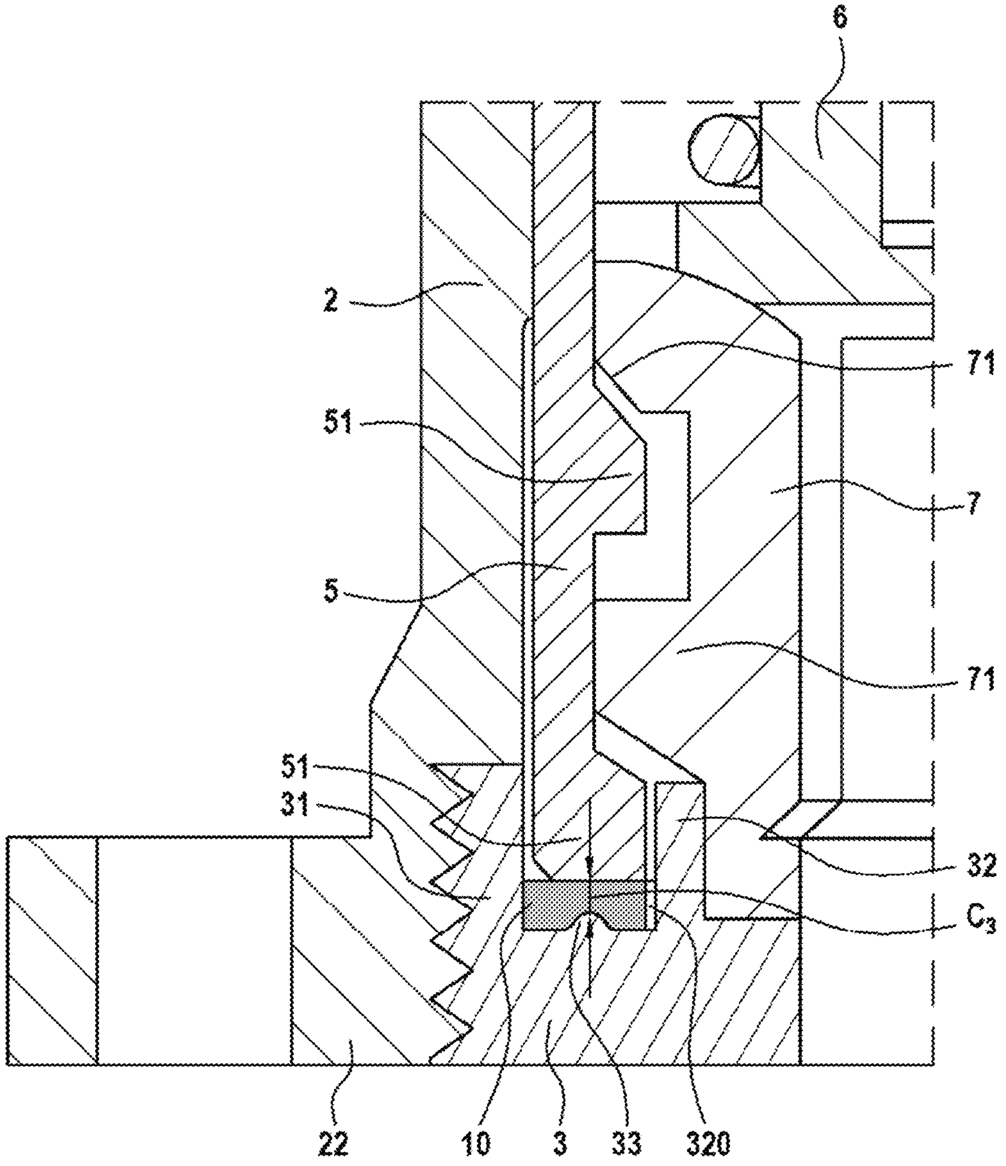

[Fig. 5]
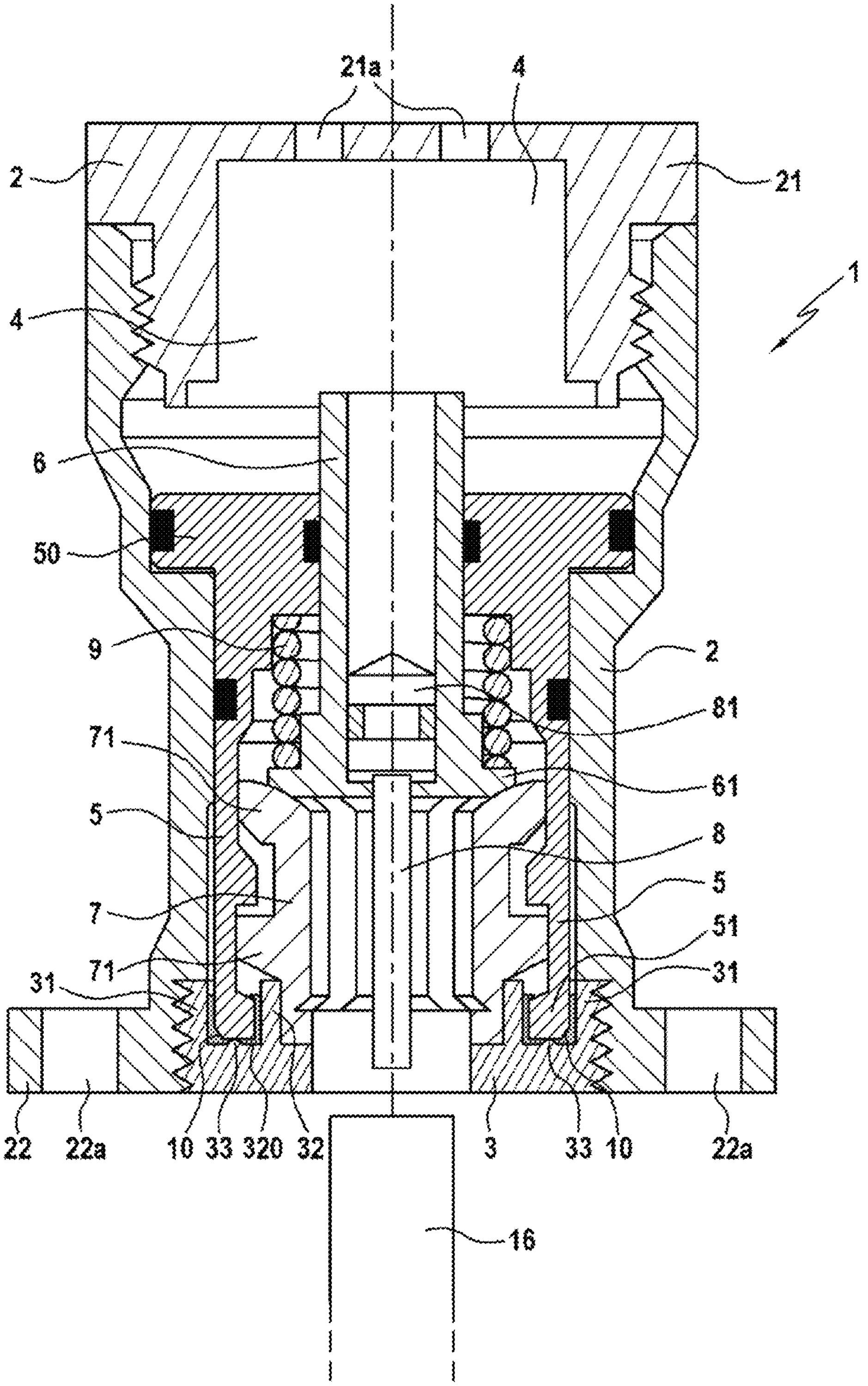

[Fig. 6]
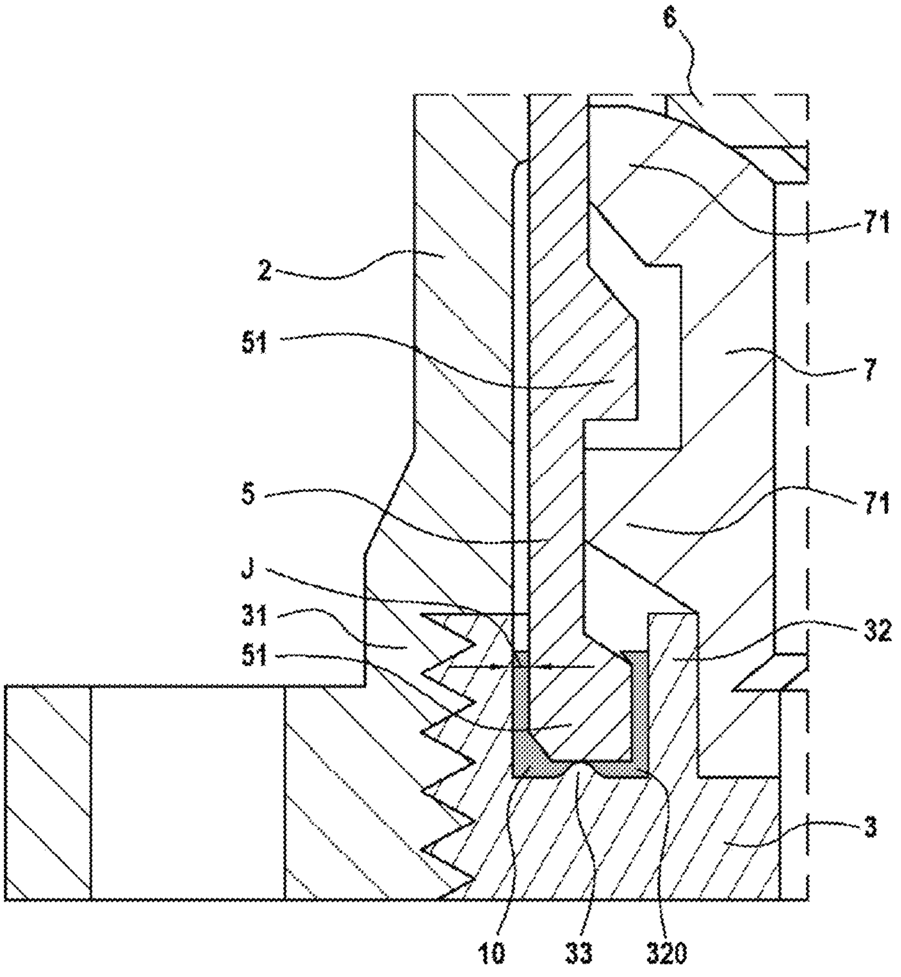

SEPARATION DEVICE COMPRISING A DAMPING ELEMENT

CROSS-REFERENCE TO RELATED APPLICATIONS

This is a National Stage Application under 35 U.S.C. § 371 of International Application No. PCT/FR2022/051395, filed Jul. 11, 2022, now published as WO 2023/285761 A1, which claims priority to French Patent Application No. 2107692, filed on Jul. 16, 2021.

TECHNICAL FIELD

The invention relates to the technical field of devices for connecting and separating objects with respect to a structure. It is more specifically about devices for separating satellites or microsatellites from a rocket, which have the purpose of separating the satellite or the microsatellite from its support and of moving it quickly away from that rocket.

PRIOR ART

For reasons of reliability, devices for separating two assemblies can involve the sliding of a release ring along a split nut. Such a device is for example described in the document U.S. Pat. No. 5,671,650A. In this document, the sliding of the release ring and the release of the split nut are used to slide a pin. In the aim of reducing the shock on impact of this pin at the track end, a solid damper is fastened to one end of the device. However, the damper has as a base and a central pad of large size and significantly increases the overall dimensions of the device. Furthermore, such a device is not re-usable.

The use of re-usable unlocking devices is more beneficial, particularly for financial and reliability-related reasons. Specifically, the reusable unlocking device makes it possible to carry out at least one test with so-called "cold" non-pyrotechnic gas, to test the performance of said device. The patent U.S. Pat. No. 4,187,759 in particular describes an unlocking device relying on the combined effect of, on the one hand, the movement of a release ring to release a split nut which tightens the connecting screw and, on the other hand, the thrust of an ejector to expel the connecting screw. A spring is placed in the device to allow the release ring to regain its initial position and therefore to allow the split nut to be re-used. However, in spite of the presence of the spring, the quick movement of the release ring causes impacts.

To limit shocks related to the movement of the release ring, the document US20200189771A1 describes a damping device comprising damping pins and a damping plate. The damping pins are arranged to mechanically damp the release ring as soon as the separating device is unlocked, i.e. as soon as the segments of the nut are released. However, the damping of the release ring from the point of unlocking reduces the reliability of the system. Specifically, in the event of failure of the device, the unlocking point cannot be passed, rendering the separation of the two assemblies difficult or even impossible. Furthermore, the addition of this damping device reduces the reusable nature of the device. Specifically, the damping pins strike and plastically deform the damping plate, i.e. deform it irreversibly.

SUMMARY OF THE INVENTION

This invention has the aim of making provision for a damping solution for damping shocks connected with the track of the release ring in devices for separating objects with respect to a structure, while remedying the aforementioned drawbacks.

For this purpose, the invention makes provision for a separating device comprising a release ring able to slide along a segmented nut between a gas expansion chamber and an annular shutter along an axial direction, the release ring being configured to move along the axial direction between a first locking position wherein the segments of the nut are retained around a fastening screw by said ring and a second position wherein the segments of the nut are released by said ring, said device being characterized in that the release ring is moreover configured to travel a determined non-zero distance along the axial direction between the second position and a third position wherein said ring is in contact with a damping element located between said ring and the annular shutter, the release ring not being in contact with the damping element between the second position and the third position, and in that the release ring is configured to compress the damping element over a determined non-zero distance along the axial direction between the third position and a fourth position wherein said ring is at its stop position.

Thus, the damping element of the release ring is only involved after the release of the segments of the nut, increasing the general reliability of the device. Furthermore, the damping element can easily be added to pre-existing separating devices, without modification of the configuration.

According to a particular feature of the invention, the distance travelled by the release ring between the third position and the fourth position accounts for between 30% and 50% of the distance travelled by the release ring between the first position and the fourth position.

According to another particular feature of the invention, a part of the damping element is able to go past in the axial direction between the release ring and the annular shutter when the release ring is between the third and the fourth position.

According to another particular feature of the invention, the separation between the outer radius of the release ring and the inner radius of the annular shutter via which a part of the damping element is able to go past in the axial direction is between 0.5 mm and 1 mm.

According to another particular feature of the invention, the damping element is disposed in a groove of the annular shutter, the volume of the damping element occupying between 50% and 70% of the inner volume of the groove.

According to another particular feature of the invention, the release ring is in contact with a protrusion present on the surface of the annular shutter when said ring is in the fourth position.

According to another particular feature of the invention, the damping element is made of an elastomer material or of a deformable plastic.

According to another particular feature of the invention, the damping element is made of a silicone having a Shore A hardness between 50 and 90.

The invention further relates to a method for separating a sub-assembly connected to a separating device according to the invention by the fastening screw, said method comprising at least:

- the release of gas in the gas expansion chamber,
- the sliding, under the action of the gas, of the release ring between the first position and the second position in such a way as to release the segments of the nut, the ejection of the fastening screw released from the nut, and the damping of the release ring by the damping element between the third and the fourth position.

BRIEF DESCRIPTION OF THE DRAWINGS

FIG. 1 is a cross-section view of a separating device according to the invention when the release ring is in the first position.

FIG. 2 is a partial section view of the separating device of FIG. 1 when the release ring is in the first position.

FIG. 3 is a partial section view of the separating device of FIG. 1 when the release ring is in the second position.

FIG. 4 is a partial section view of the separating device of FIG. 1 when the release ring is in the third position.

FIG. 5 is a cross-section view of the separating device of FIG. 1 when the release ring is in the fourth position.

FIG. 6 is a partial section view of the separating device of FIG. 1 when the release ring is in the fourth position.

DESCRIPTION OF THE EMBODIMENTS

FIGS. 1 to 6 illustrate a separating device 1 according to the invention. Here it is a preferred embodiment of the invention. One does not, of course, depart from the scope of the invention if elements or the operation of certain elements of the separating device described hereinafter are modified, as long as the damping of the release ring operates in a similar way to the description hereinafter. Neither does one depart from the scope of the invention if elements are added to the separating device or removed from the separating device described hereinafter, provided that the operation of the damping element described hereinafter is not modified.

When the separating device 1 is in the locked position, said separating device 1 is connected to a sub-assembly by way of a connecting screw 16. The separating device 1 allows the separation of the sub-assembly by the ejection of the connecting screw 16.

The separating device 1 illustrated in FIGS. 1 to 6 comprises a hollow body 2, which is a relatively cylindrical part possessing an upstream end and a downstream end. The upstream end has an upstream flare 21 including two cylindrical bores 21*a* allowing connection with a gas intake and exhaust device. These two cylindrical bores open onto a gas expansion chamber 4 located inside the body 2.

The downstream end of the body 2 has a widened base 22 including, on a peripheral ring, two diametrically opposed bores 22*a* each intended to receive a screw such as to secure said separating device 1 to the sub-assembly. The downstream end of the body 2 also has a downstream flare 23 taking the form of a threaded hollow cylindrical part of an internal diameter greater than that of the central part of the body 2. The flare 23 present at the downstream end of the body 2 is intended to receive an annular shutter 3, which is screwed into said downstream end 23.

The annular shutter 3 takes the form of a flat disc extended by a peripheral collar 31 threaded on its outer lateral surface, which will be intended to ensure the screwing into the downstream flare 23 of the hollow body 2. The peripheral collar 31 of the shutter 3 may include radial bores located in the extension of radial bores present on the downstream flare 23 of the body 2, allowing the passage of pins to improve the fastening of the shutter 3 to the body 2. The shutter 3 further includes a central bore extended by an inner collar 32 allowing the passage of the connecting screw 16. The height of the inner collar 32 is less than the height of the outer collar 31. The inner collar 32 defines with the peripheral collar 31 a groove 320. The depth of the groove 320 is equivalent to the height of the inner collar 32.

According to a particular embodiment of the invention, the shutter 3 may include a circular protrusion 33 of small height located in the groove 320, between the inner collar 32 and the peripheral collar 31.

A damping element 10 taking the form of a ring is disposed in the groove 320 of the shutter 3, between the peripheral collar 31 and the inner collar 32. Preferably, the damping element 10 is placed in contact with the peripheral collar 31 and spaced by the inner collar 32. The damping element 10 can be placed on the circular protrusion 33. According to a particular embodiment of the invention, the volume occupied by the damping element 10 corresponds to between 50% and 70% of the volume of the groove 320 of the shutter 3.

The damping element 10 can be made of an elastomer material. For example, the damping element 10 can be made of silicone. The damping element 10 can have a Shore A hardness between 50 and 90. The damping element 10 can also be made of a deformable plastic or a polymer, for example made of polyether ether ketone (known as PEEK). The damping element can also have a honeycomb structure.

The separating device 1 further comprises a release ring 5. The separating device 5 is a hollow cylindrical part having two free ends, one of which has a widened base 50 having a planar circular outer face equipped with a central bore. The ring 5 is traversed by a central channel of variable section, having overall an upstream part of reduced internal diameter and traversing the widened base 50, and a downstream part of greater internal diameter having on its inner lateral wall two annular protrusions 51, similar to two mutually parallel rings, each protrusion 51 having a substantially trapezoidal section, the apex of which is planar, thus making it possible to define a planar annular upper face. One of the two protrusions 51 is located at the end of the downstream part of the central channel of the ring 5. The separating device 5 tightens a segmented nut 7 and a hollow cylindrical part called a separator 6, these two parts 7 and 6 being in contact and in continuity with one another.

The segmented nut 7, which has a substantially cylindrical shape, is divided into four identical segments along four radial, mutually perpendicular planes, and, when the four segments touch one another, said nut 7 has a threaded central channel into which the connecting screw 16 connecting the device 1 to the sub-assembly is connected. The outer lateral surface of said nut 7 has two annular protrusions 71, similar to two mutually parallel rings, each protrusion 71 having a substantially trapezoidal section the apex of which is planar, thus making it possible to define a planar annular upper face. One of the two ends of the nut 7 terminates in one of the two protrusions 71 and has a slightly convex surface profile. The two protrusions 71 of the nut 7 have a separation identical to that made by the two annular protrusions 51 located on the inner wall of the ring 5.

When the release ring 5 of the separating device 1 is in a first position, as illustrated in FIGS. 1 and 2, the segmented nut 7 is tightened in the ring 5 in such a way that the annular protrusions 71 are in contact with those 51 of said ring 5 at the level of their respective planar upper faces. Thus positioned, the nut 7 takes a compacted form with segments that touch one another.

The separator 6 is formed by a hollow cylindrical body possessing at one of its ends a slightly concave widened head having a central bore, the other end opening into the expansion chamber 4. The separator 6 is located in the upstream part of the central channel of the ring 5 and emerges from the planar circular outer face of the widened base of said ring 5. The separator 6 has the same axis of revolution as the nut 7 and is in contact with said nut 7 by way of its widened head 61, which then abuts against the slightly convex end of the nut 7.

An ejector 8 slides in the hollow cylindrical body of the separator 6. The ejector 8 is a part of substantially the same length as the separator 6 formed by a cylindrical body, one end of which terminates in a slightly beveled widened head 81 having a diameter substantially equal to the internal diameter of the separator 6.

When the release ring 5 of the separating device 1 is in the first position, as illustrated in FIG. 1, the ejector 8 is housed in the separator 6 in such a way that its cylindrical body traverses the widened head 61 of said separator 6 to then bear against the connecting screw 16 and in such a way that the widened head 81 of said ejector 8 is flush with the end of the separator 6 emerging into the expansion chamber 4.

A spring 9 is located in the space between the separator 6 and the release ring 5, then bearing at the same time against the widened head 61 of the separator 6 and the inner face of the widened base 50 of the ring 5.

FIGS. 1 and 2 illustrate the configuration of the separating device 1 when the release ring 5 is in the first position. The first position of the release ring 5 corresponds to a stable locked configuration of the separating device 1, wherein said device is in an initial rest position.

When the separation of the sub-assembly is desired, the operating mode is carried out as follows. When the order of separation is sent, for example in the form of an electrical pulse igniting a gas generator, gas floods the expansion chamber 4, entering via the cylindrical bores 21*a* present on the upstream flare 21 of the body 2. Thus, the gas present in the chamber 4 then exerts pressure simultaneously on the base 50 of the release ring 5, on the widened head 81 of the ejector 8 as well as on the end of the separator 6 emerging into the expansion chamber 4.

When the pressure in the expansion chamber reaches a threshold value, the release ring 5 starts to slide toward the shutter 3, thus sliding the protrusions 51 of the ring 5 against the protrusions 71 of the nut 7.

When the protrusions 51 of the ring 5 project past the protrusions 71 of the nut 7, the protrusions 71 of the segmented nut 7 are released from the ring 5, as illustrated in FIG. 3. The segments of the nut 7 will then tend to open in a "petal-like" manner and come into contact with the surfaces of larger diameter of the inner channel of the release ring 5. The opening of the segments is helped by the action of the separator 6 which exerts pressure on the nut 7 by way of its widened head 61. The position of the release ring 5 just after the release of the segments of the nut 7 defines a second position of the release ring 5, illustrated in FIG. 3. In this second position, the distance $d_2$ between the release ring 5 and the damping element 10 is non-zero.

The opening of the segments of the nut 7 drives the disengagement of said nut 7 from the connecting screw 16. The connecting screw 16, undergoing the thrust of the ejector 8, is expelled, this causing the separation of the separating device 1 from the sub-assembly. The release ring 5 continues freely along its track, before coming into contact with the damping element 10. The position of the release ring 5 at the time of its coming into contact with the damping element 10 defines a third position of said release ring 5, illustrated by FIG. 4.

The release ring 5 is then dampened by said damping element 10, thus avoiding an excessive shock against the shutter 3. The release ring 5 can be stopped by the circular protrusion 33 of the shutter 3. The position of the release ring 5 when it arrives at the stop against the shutter 3 or inside the damping element 10 defines a fourth position of said release ring 5, illustrated in FIGS. 5 and 6. In particular, FIG. 5 illustrates the configuration of the separating device 1 in the unlocked position, i.e. when the release ring 5 has come to the end of its track and the sub-assembly has been separated from the device 1.

In order to increase the chances of successful unlocking in the event of a failure, it is preferable for the release ring 5 to come into contact with the damping element 10 after the segments of the nut 7 have been released. Specifically, the non-zero distance travelled by the release ring 5 between the second position, wherein the segments of the nut 7 have just been released, and the third position, wherein the release ring 5 comes into contact with the damping element 10, is a free undamped track.

According to a particular embodiment of the invention visible in FIGS. 1 to 6, the damped track distance $c_3$ travelled by the release ring 5 after its contact with the damping element 10, i.e. the distance travelled by the release ring 5 between the third and the fourth position, must correspond to between 30% and 50% of the total track distance ci travelled by the release ring 5, i.e. between 30% and 50% of the distance travelled by the separating device 5 between the first and the fourth position. These proportions allow a very satisfactory damping of the release ring 5 while guaranteeing a high level of security of the system.

In order to improve the damping of the release ring 5, a part of the damping element 10 can go past and go back up along the release ring, in the direction of the track of the ring 5. Thus, as illustrated in FIGS. 5 and 6, a part of the damping element 10 is present in the clearance J between the outer walls of the release ring 5 and the inner walls of the outer collar 31 of the shutter 3. The clearance J corresponds to the separation between the outer radius of the release ring 5 and the inner radius of the outer collar 31 of the shutter 3. According to a particular embodiment of the invention, the clearance J can be between 0.5 mm and 1 mm.

When the separating device 1 is tested using non-pyrotechnic, so-called "cold gas", the return force of the spring 9 is triggered when the gas pressure dissipates. By releasing, the spring 9 forces the release ring 5 to return to its initial position and brings the separating nut 7 to its initial state. Thus, the spring 9 makes it possible to slide the release ring 5 between the fourth position and the first position. The damping element 10 also returns to a state closed to its initial state, or even identical to its initial state. The addition of a new connecting screw brings the ejector 8 to its initial position such that the separating device 1 is once again ready for use. The separating device 1 is consequently re-usable.

The invention claimed is:

1. A separating device comprising: a release ring able to slide along a segmented nut between a gas expansion chamber and an annular shutter along an axial direction, the release ring being configured to move along the axial direction between a first locking position wherein segments of the nut are retained around a fastening screw by said release ring and a second position wherein the segments of the nut are released by said release ring, wherein the release ring is configured to travel a determined non-zero distance along the axial direction between the second position and a third position wherein said ring is in contact with a damping element located between said ring and the annular shutter, the release ring not being in contact with the damping element between the second position and the third position such that the segments of the nut are completely released before the release ring moves from the second position to the third position, and in that the release ring is configured to compress the damping element over a determined non-zero distance along the axial direction between the third position and a fourth position wherein said ring is at a stop position thereof.

2. The separating device as claimed in claim 1, wherein the distance travelled by the release ring between the third position and the fourth position accounts for between 30% and 50% of the distance travelled by the release ring between the first position and the fourth position.

3. The separating device as claimed in claim 1, wherein a part of the damping element is configured to be extruded in the axial direction between the release ring and the annular shutter when the release ring is between the third and the fourth position.

4. The separating device as claimed in claim 3, wherein the separation between an outer radius of the release ring and an inner radius of the annular shutter via which the part of the damping element is extruded in the axial direction is between 0.5 mm and 1 mm.

5. The separating device as claimed in claim 1, wherein the damping element is disposed in a groove of the annular shutter, a volume of the damping element occupying between 50% and 70% of an inner volume of the groove.

6. The separating device as claimed in claim 1, wherein the release ring is in contact with a protrusion present on a surface of the annular shutter when said ring is in the fourth position.

7. The separating device as claimed in claim 1, wherein the damping element is made of an elastomer material or of a deformable plastic.

8. The separating device as claimed in claim 1, wherein the damping element is made of a silicone having a Shore A hardness between 50 and 90.

9. A method for separating a sub-assembly connected to a separating device as claimed in claim 1 by the fastening screw, said method comprising at least:

the release of gas in the gas expansion chamber, the sliding, under an action of the gas, of the release ring between the first position and the second position in such a way as to release the segments of the nut, ejection of the fastening screw released from the nut, and the damping of the release ring by the damping element between the third and the fourth position.

10. A separating device comprising: a release ring able to slide along a segmented nut between a gas expansion chamber and an annular shutter along an axial direction, the release ring being configured to move along the axial direction between a first locking position wherein segments of the nut are retained around a fastening screw by said release ring and a second position wherein the segments of the nut are released by said release ring, wherein the release ring is configured to travel a determined non-zero distance along the axial direction between the second position and a third position wherein said ring is in contact with a damping element located between said ring and the annular shutter, the release ring not being in contact with the damping element between the second position and the third position, and in that the release ring is configured to compress the damping element over a determined non-zero distance along the axial direction between the third position and a fourth position wherein said ring is at a stop position thereof, wherein the release ring is in contact with a protrusion present on a surface of the annular shutter when said ring is in the fourth position.

11. The separating device as claimed in claim 10, wherein the distance travelled by the release ring between the third position and the fourth position accounts for between 30% and 50% of the distance travelled by the release ring between the first position and the fourth position.

12. The separating device as claimed in claim 10, wherein a part of the damping element is configured to be extruded in the axial direction between the release ring and the annular shutter when the release ring is between the third and the fourth position.

13. The separating device as claimed in claim 12, wherein the separation between an outer radius of the release ring and an inner radius of the annular shutter via which the part of the damping element is extruded in the axial direction is between 0.5 mm and 1 mm.

14. The separating device as claimed in claim 10, wherein the damping element is disposed in a groove of the annular shutter, a volume of the damping element occupying between 50% and 70% of an inner volume of the groove.

15. The separating device as claimed in claim 10, wherein the damping element is made of an elastomer material or of a deformable plastic.

16. The separating device as claimed in claim 10, wherein the damping element is made of a silicone having a Shore A hardness between 50 and 90.

17. A method for separating a sub-assembly connected to a separating device as claimed in claim 10 by the fastening screw, said method comprising at least:

the release of gas in the gas expansion chamber, the sliding, under an action of the gas, of the release ring between the first position and the second position in such a way as to release the segments of the nut, ejection of the fastening screw released from the nut, and the damping of the release ring by the damping element between the third and the fourth position.

18. A separating device comprising: a release ring able to slide along a segmented nut between a gas expansion chamber and an annular shutter along an axial direction, the release ring being configured to move along the axial direction between a first locking position wherein segments of the nut are retained around a fastening screw by said release ring and a second position wherein the segments of the nut are released by said release ring, wherein the release ring is configured to travel a determined non-zero distance along the axial direction between the second position and a third position wherein said ring is in contact with a damping element located between said ring and the annular shutter, the release ring not being in contact with the damping element between the second position and the third position, and in that the release ring is configured to compress the damping element over a determined non-zero distance along the axial direction between the third position and a fourth position wherein said ring is at a stop position thereof, wherein a part of the damping element is configured to be extruded in the axial between the release ring and the annular shutter when the release ring is between the third and the fourth position.

19. The separating device as claimed in claim 18, wherein the distance travelled by the release ring between the third position and the fourth position accounts for between 30% and 50% of the distance travelled by the release ring between the first position and the fourth position.

20. The separating device as claimed in claim 18, wherein the separation between an outer radius of the release ring and an inner radius of the annular shutter via which the part of the damping element is extruded in the axial direction is between 0.5 mm and 1 mm.

* * * * *